United States Patent
Kusama et al.

(10) Patent No.: US 6,724,946 B1
(45) Date of Patent: Apr. 20, 2004

(54) IMAGE PROCESSING METHOD, APPARATUS AND STORAGE MEDIUM THEREFOR

(75) Inventors: Kiyoshi Kusama, Kawasaki (JP); Kentaro Matsumoto, Higashikurume (JP); Miyuki Enokida, Yokohama (JP); Kunihiro Yamamoto, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/532,077

(22) Filed: Mar. 21, 2000

(30) Foreign Application Priority Data

Mar. 26, 1999 (JP) .......................... 11-084403
Apr. 1, 1999 (JP) .......................... 11-094860

(51) Int. Cl.[7] .............................. G06K 9/36
(52) U.S. Cl. ................ 382/284; 382/260; 382/266; 348/218.1
(58) Field of Search ............... 382/154, 260, 382/266, 264, 284, 294, 236; 358/564; 348/588, 335, 218.1

(56) References Cited

U.S. PATENT DOCUMENTS

| | | | | |
|---|---|---|---|---|
| 6,031,937 A | * | 2/2000 | Graffagnino | 382/236 |
| 6,075,905 A | * | 6/2000 | Herman et al. | 382/284 |
| 6,137,498 A | * | 10/2000 | Silvers | 345/629 |
| 6,137,914 A | * | 10/2000 | Ligtenberg et al. | 382/240 |
| 6,373,992 B1 | * | 4/2002 | Nagao | 382/266 |

FOREIGN PATENT DOCUMENTS

| | | | | |
|---|---|---|---|---|
| JP | 61-121589 A | 6/1986 | | H04N/7/13 |
| JP | 62-010777 | 1/1987 | | G06F/15/72 |
| JP | 2-132967 | 5/1990 | | H04N/1/393 |
| JP | 3-036672 | 2/1991 | | G06F/15/68 |
| JP | 05-014735 A | 1/1993 | | H04N/1/41 |
| JP | 5-143727 | 6/1993 | | G06F/15/68 |
| JP | 09-275560 A | 10/1997 | | H04N/7/24 |
| JP | 10-269353 A | 10/1998 | | G06T/5/00 |

OTHER PUBLICATIONS

U.S. patent application Ser. No. 09/022,973 filed Feb. 12, 1998.
U.S. patent application Ser. No. 09/116,497 filed Jul. 16, 1998.
U.S. patent application Ser. No. 09/320,570 filed May 27, 1999.
U.S. patent application Ser. No. 09/366,767 filed Aug. 4, 1999.
U.S. patent application Ser. No. 09/384,965 filed Aug. 30, 1999.

* cited by examiner

*Primary Examiner*—Bhavesh M. Mehta
*Assistant Examiner*—Ali Bayat
(74) *Attorney, Agent, or Firm*—Fitzpatrick, Cella, Harper & Scinto

(57) ABSTRACT

Disclosed are an image processing method, apparatus and storage medium for forming a mosaic image by combining a plurality of material images. The method includes dividing an image, which is the basis of the mosaic image, into a plurality of tile areas, obtaining an image characteristic of each tile area obtained by division, calculating distances between the image characteristics of each of the tile areas and image characteristics of respective ones of the plurality of material images, selecting material images corresponding to each of the tile areas in dependence upon result of calculation of the distances, forming a mosaic image by pasting the selected material images to the corresponding tile areas, and subjecting this mosaic image to filtering processing, thereby generating a mosaic image in which the joints between tile areas are no longer noticeable.

13 Claims, 14 Drawing Sheets

FIG. 8

| $\frac{1}{16}$ | $\frac{1}{8}$ | $\frac{1}{16}$ |
|---|---|---|
| $\frac{1}{8}$ | $\frac{1}{4}$ | $\frac{1}{8}$ |
| $\frac{1}{16}$ | $\frac{1}{8}$ | $\frac{1}{16}$ |

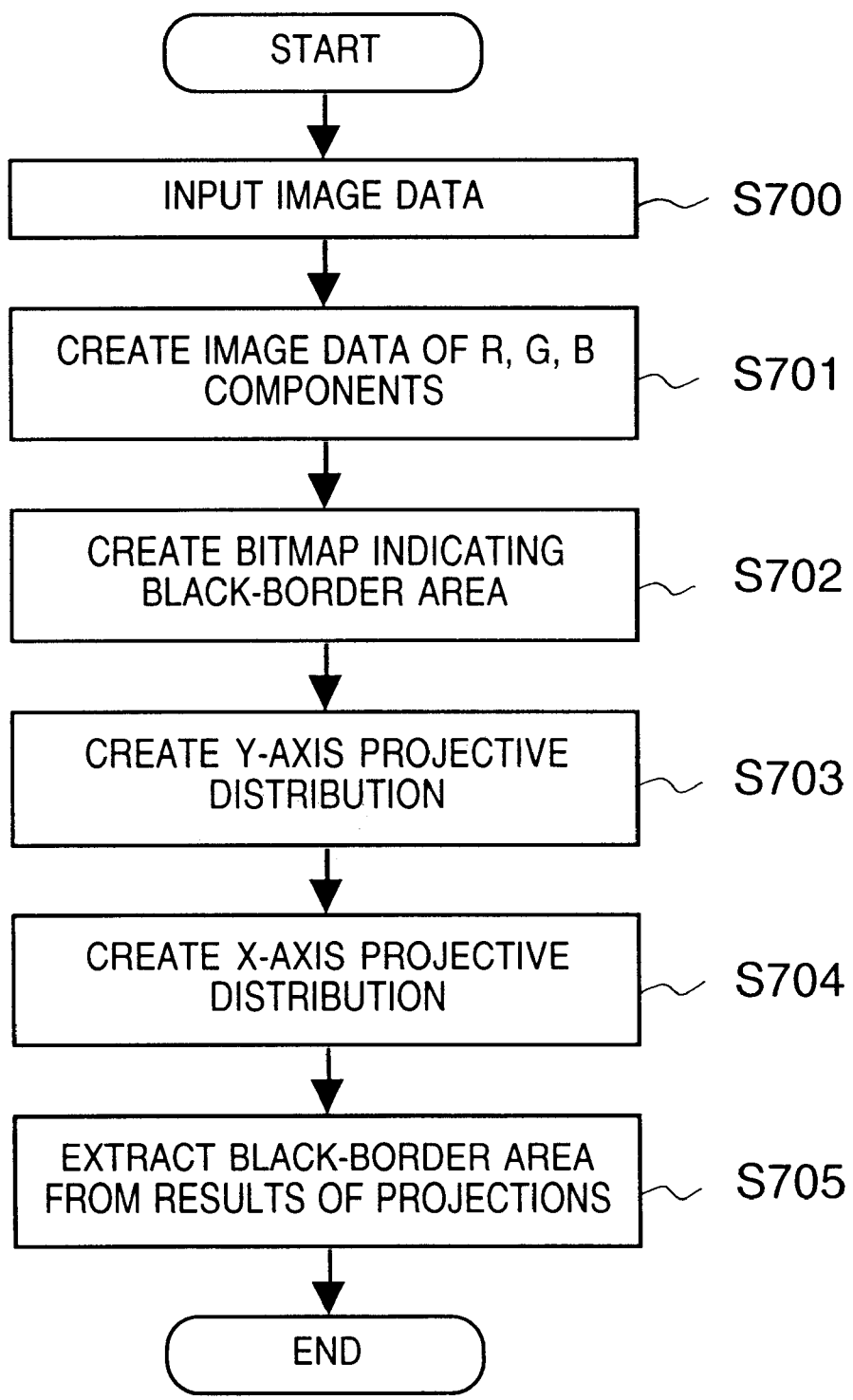

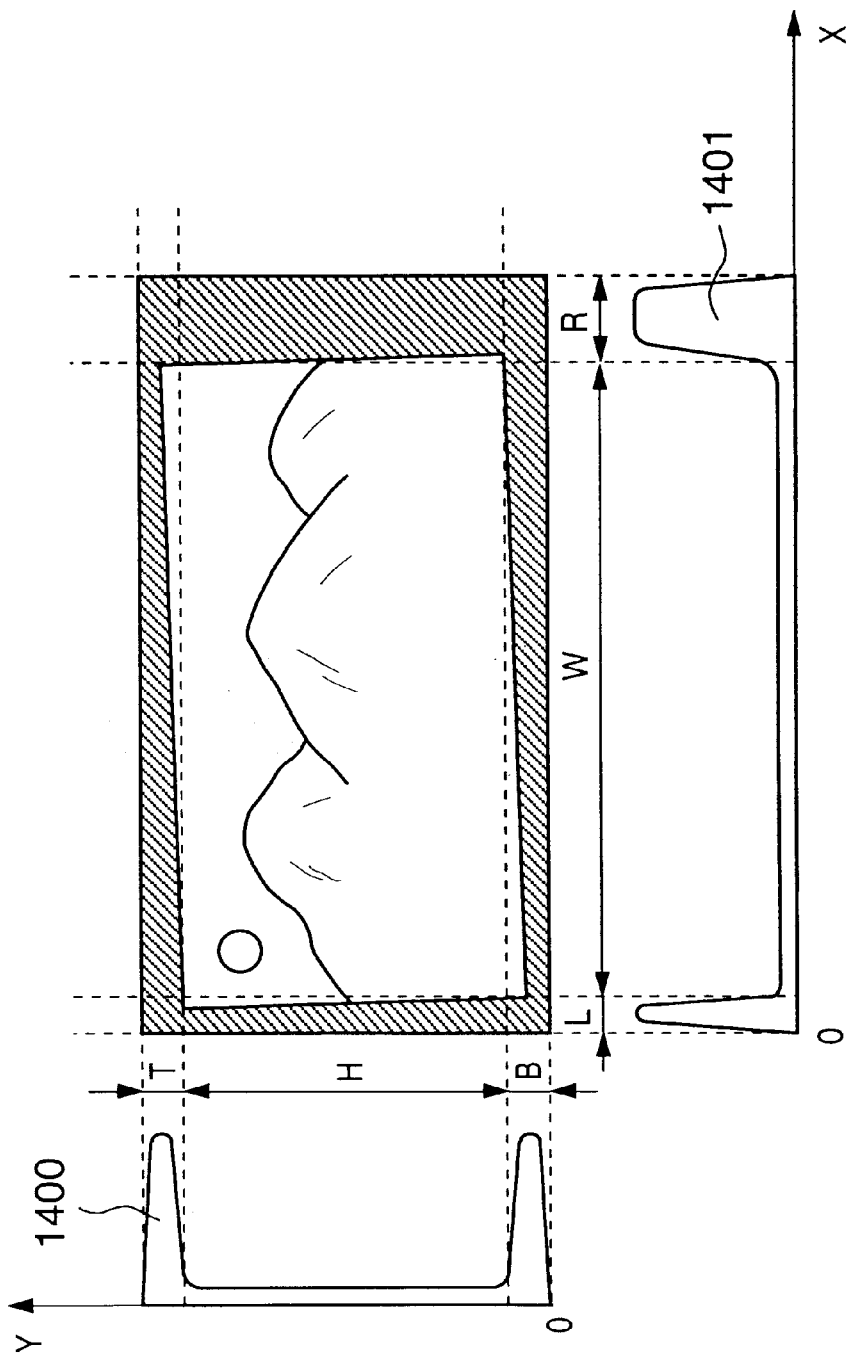

IMAGE PROCESSING METHOD, APPARATUS AND STORAGE MEDIUM THEREFOR

FIELD OF THE INVENTION

This invention relates to an image processing method, apparatus and storage medium for generating a mosaic image by combining a plurality of material images into a mosaic pattern.

BACKGROUND OF THE INVENTION

According to Sanseido's "Dictionary of the Modern Japanese Language", a mosaic is a "design or method in which small pieces of stone, glass or marble etc. of various colors are combined and imbedded in a floor or wall." By using this technique, a number of photographic images can be combined to form a design or a single image (i.e., a mosaic image). The generation of a mosaic image is achieved by splitting the basic plan or image into a plurality of tiles and pasting material images that most closely resemble these tile images to the tile areas.

When such a mosaic image is created, the original image of interest is divided up into a plurality of areas (tile areas), material images (tile images) which will constitute the mosaic image are selected from a plurality of material images and the selected material image are affixed to respective ones of the tile areas to create the mosaic image. When this is done, the joints between adjacent tile areas become discontinuous, resulting in a mosaic image of poor quality.

A material image of the kind mentioned above is selected by comparing the image feature quantity of a tile area, which has been obtained by splitting up the original image of interest, and the image feature quantities of the available material images. When the feature quantity of a material image is calculated, there are cases where an image area such as a black border surrounds each material image, depending upon the database which stores the plurality of material images. Such a black border is an unnecessary image area when a mosaic image is formed and, as a consequence, gives rise to certain problems.

Specifically, when, in calculating the feature quality of a material image, the average density within the material image, for example, is calculated taking the black border into account, the calculated value is influenced by the black border and differs from the feature quantity of the original material image.

Further, in a case where the image of each tile area obtained by dividing up the original image is compared with each material image and a material image suited to a tile area is selected, here too the black border has an influence. As a consequence, material images close to the features of the images of the tile areas will no longer be selected.

The above-cited problems arise not only when a mosaic image is formed but also when the feature quantity of each material image is calculated in a search of similar images for the purpose of selecting a material image similar to an image of interest.

Further, when material images which include the above-mentioned black borders are used as is to form a mosaic image, the mosaic image formed develops a grid-shaped pattern ascribable to the black borders. Such a mosaic image is of poor quality.

SUMMARY OF THE INVENTION

Accordingly, an object of the present invention is to provide an image processing method, apparatus and storage medium in which filtering processing is applied to a mosaic image to mitigate the discontinuity of the tile areas and thereby improve the quality of the mosaic image.

Another object of the present invention is to provide an image processing method, apparatus and storage medium in which filtering processing is applied to the pixels at the joints of adjacent areas in a mosaic image to thereby make the joints unnoticeable and form a high-quality mosaic image.

A further object of the present invention is to provide an image processing method, apparatus and storage medium in which a predetermined area is removed from material images and, in dependence upon the feature quantities of these material images from which the predetermined area has been removed and the feature quantities of the areas constituting an image of interest, a material image conforming to each of these areas is selected from the plurality of material images, thereby preventing deterioration of the mosaic image caused by the image of the predetermined area originally contained in each material image.

According to the present invention, the foregoing objects are attained by providing an image processing apparatus for forming a mosaic image by combining a plurality of material images, comprising: dividing means for dividing an image, which is the basis of the mosaic image, into a plurality of areas; image characteristic acquisition means for obtaining an image characteristic of each area obtained by division by the dividing means; mosaic image forming means for selecting material images, which corresponds to respective ones of the areas, in dependence upon distances between the image characteristic of each area and the image characteristics of respective ones of the plurality of material images, and pasting the selected material images together to thereby form a mosaic image; and filtering means for applying filtering processing to the mosaic image formed by the mosaic image forming means.

Further, according to the present invention, the foregoing objects are attained by providing an image processing method for forming a mosaic image by combining a plurality of material images, comprising the steps of dividing an image, which is the basis of the mosaic image, into a plurality of areas; forming a mosaic image by selecting and pasting together material images conforming to respective ones of the areas obtained by division; and applying filtering processing to the mosaic image.

Further, according to the present invention, the foregoing objects are attained by providing an image processing method for forming a mosaic image by combining a plurality of material images, comprising: a dividing step of dividing an image, which is the basis of the mosaic image, into a plurality of areas; a removal step of removing an image of a predetermined area contained in each of the material images; a selection step of comparing each area obtained by division at the dividing step with the material images from which the predetermined area has been removed at the removal step, and selecting a material image that corresponds to each area; and a forming step of forming a mosaic image by pasting, to these areas, the material images, which have been selected at the selection step, from which the predetermined area has been removed at the removal step.

Further, according to the present invention, the foregoing objects are attained by providing an image processing apparatus for forming a mosaic image by combining a plurality of material images, comprising: dividing means for dividing an image, which is the basis of the mosaic image, into a plurality of areas; removal means for removing an image of a predetermined area contained in each of the material images; selection means for comparing each area obtained by division by the dividing means with the material images from which the predetermined area has been removed by the removal means, and selecting a material image that corresponds to each area; and forming means for forming a mosaic image by pasting, to the areas, the material images, which has been selected at the selection step, from which the predetermined area has been removed at the removal step.

The filtering processing is processing for applying a low-pass filter to each pixel of the mosaic image.

Further, the low-pass filter is an edge softening filter.

Further, the filtering processing is processing for applying a low-pass filter to each pixel of a boundary portion of each area of the mosaic image.

Further, the low-pass filter is a filter for averaging the density of pixels bracketing the boundary portion.

The above-mentioned predetermined area is a border area of the material image.

Further, the selection means includes calculation means for obtaining an image characteristic of each area obtained by division by the dividing means, and calculating distances between the image characteristics of each of the areas and image characteristics of respective ones of the material images from which the image of the predetermined area has been removed by the removal means, wherein the selection means selects material images corresponding to each of the areas in dependence upon result of calculation performed by the calculation means.

Further, the above-mentioned distance is decided based upon the difference between average values of respective ones of R, G, B components of each area and average values of respective ones of R, G, B components of each material image.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 8 is a diagram useful in describing a low-pass filter according to the first embodiment of the present invention;

FIG. 13 is a flowchart illustrating an operation for detecting the black border of a material image in accordance with the third embodiment; and FIG. 14 is a diagram showing a black border of a material image.

DESCRIPTION OF THE PREFERRED EMBODIMENTS

Preferred embodiments of the present invention will now be described in detail with reference to the accompanying drawings.

First Embodiment

A first embodiment of the present invention will now be described with reference to the drawings.

Figure 1:
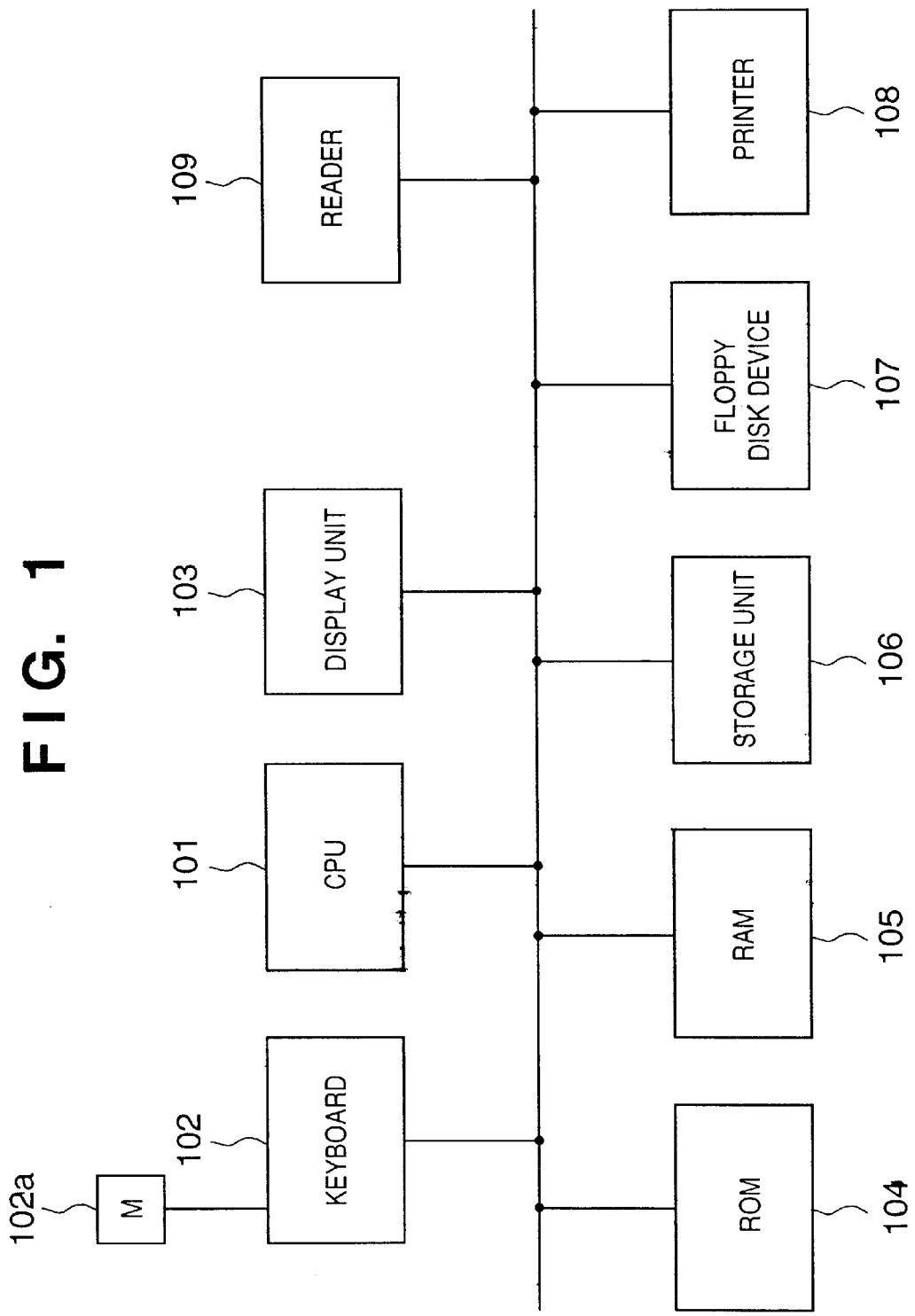
FIG. 1 is a block diagram illustrating the construction of an image processing apparatus according to an embodiment of the present invention.

FIG. 1 is a block diagram illustrating the construction of an image processing apparatus for generating a mosaic image according to this embodiment of the present invention.

As shown in FIG. 1, the apparatus includes a CPU 101 for controlling the entire apparatus in accordance with a program installed in a storage unit 106 such as a hard disk in advance and loaded into a RAM 105 at the time of execution. A keyboard 102 is used together with a mouse 102a in order to input various commands and data to the image processing apparatus of this embodiment. A display unit 103, which has a CRT or liquid crystal panel, displays image data that has been stored in the storage unit 106 or an image input from an reader 109. A ROM 104 and the RAM 105 constitute the memory of the apparatus and store the executed program and data, etc. Further, the storage unit 106 has, e.g., a hard disk, a CD-ROM or an optical disk and constitutes an image database along with various programs. A floppy disk device 107 constitutes an external storage device used by the image processing apparatus of this embodiment. A printer 108 is connected to the apparatus.

Figure 2:
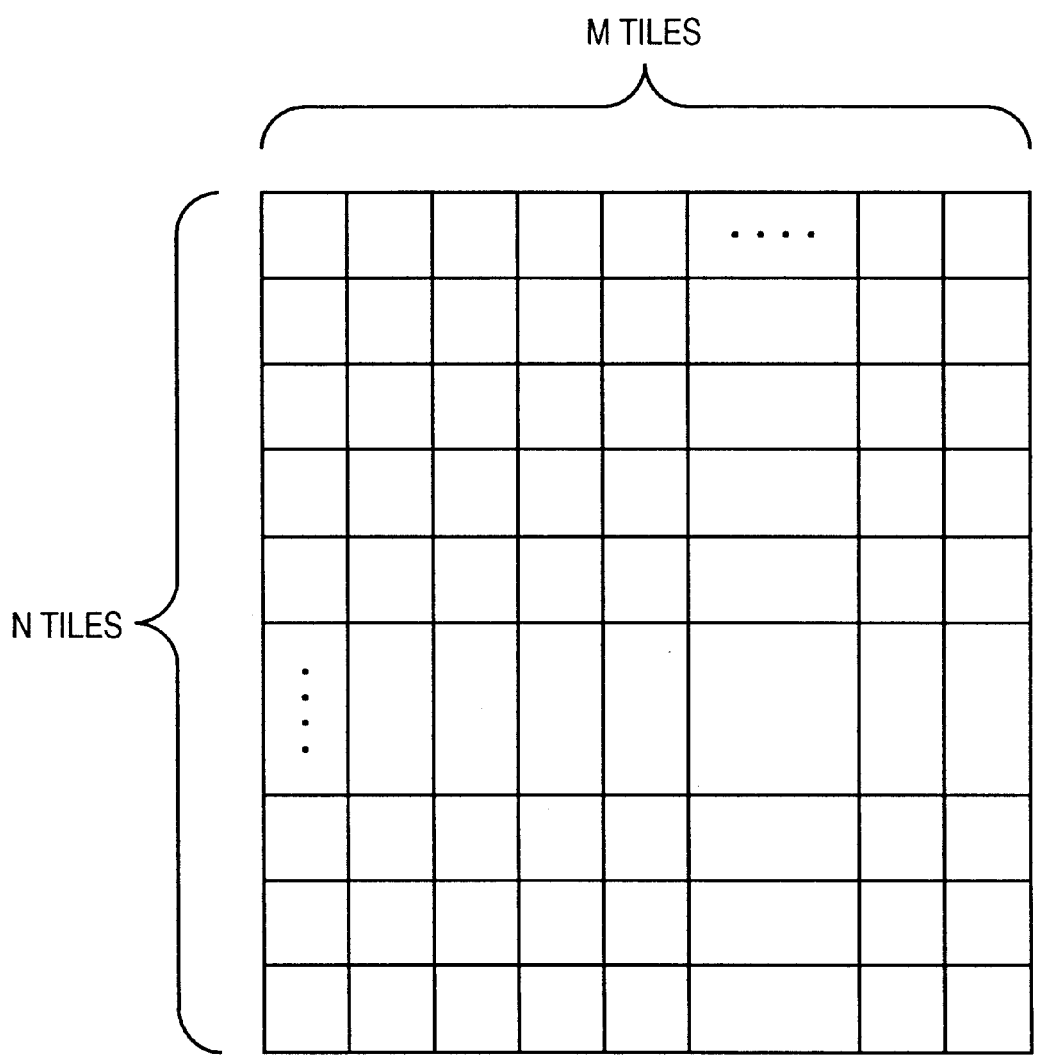
FIG. 2 is a diagram showing a state in which a first image (original image) has been divided into M×N tile areas.
Figure 3:
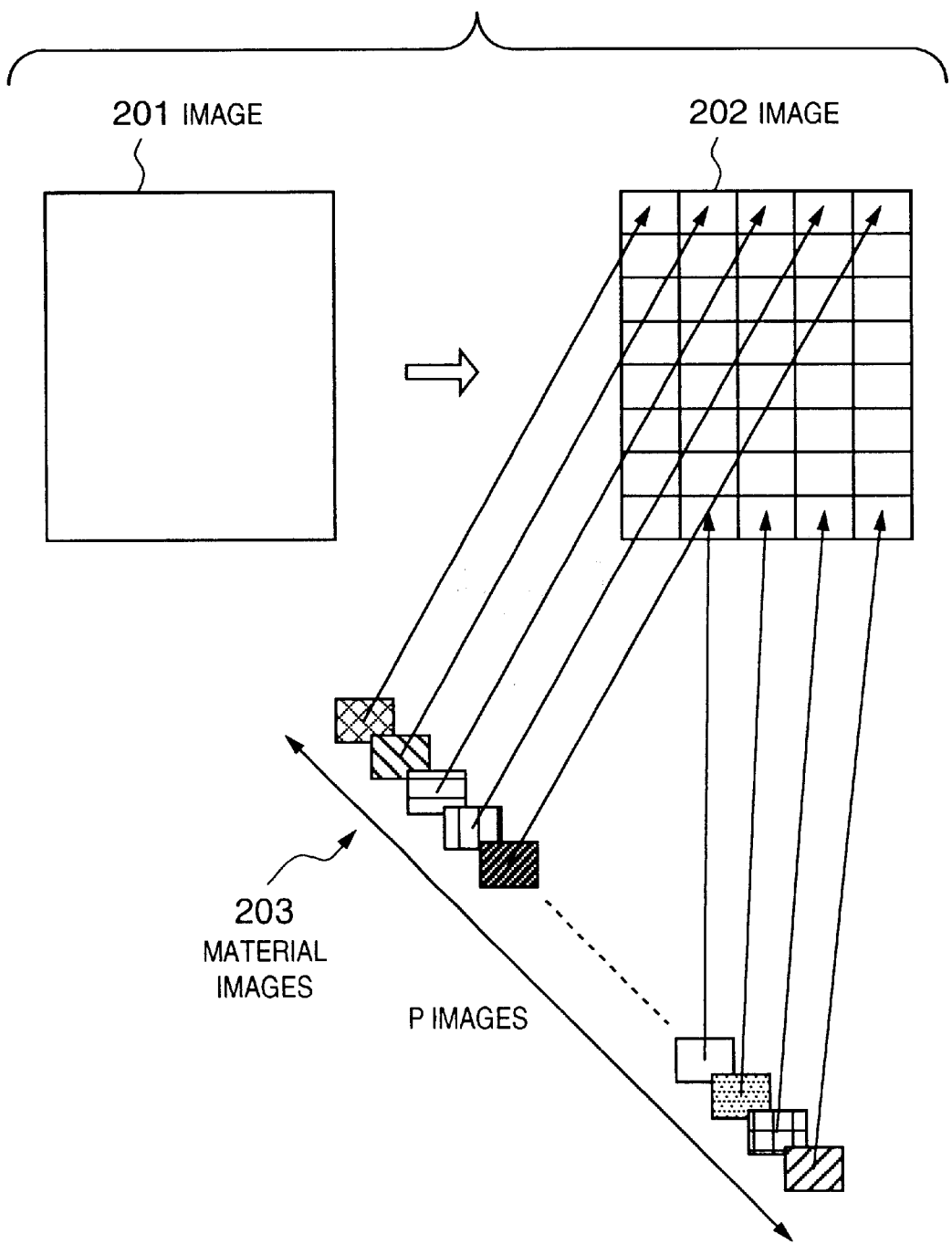
FIG. 3 is a diagram showing the relationship between the first image (original image) of interest and material images of a plurality of types used in a mosaic.

Further, a plurality (P-number) of tile images which are the components of a mosaic image have been stored in the storage unit 106. In accordance with a program, described later, a mosaic image is created by combining M×N number of images, which have been selected from these material images, to obtain M images in the horizontal direction and N images in the vertical direction, as shown in FIGS. 2 and 3. The mosaic image thus created is stored in the storage unit 106 as an image file and is displayed on the display unit 103 or printed out by a printer 108. The reader 109 is a scanner, for example, for reading in an image.

It should be noted that the image processing apparatus of this embodiment is provided with various components other than those mentioned above. However, as these components do not constitute a principal portion of the present invention, they need not be described here.

FIG. 2 is a diagram showing an example in which a first image 201, which is an image of interest (i.e., the original image), has been divided into M×N number of tile areas.

FIG. 3 is a diagram for describing the relationship among images of a plurality of types used in general mosaic processing.

The first image 201 in FIG. 3 is a design or image (e.g., a photographic image, a computer-graphics image, etc.) on the basis of which an image is to be formed by a mosaic. A second image 202 is a mosaic image formed by dividing the first image 201 into a plurality of tile areas and pasting material images 203 onto these areas. Here the number P of material images 203 generally is large enough to meet the color and texture requirements for forming the second image 202.

In order to simplify the description, the size of each material image 203 is made the same as that of the tile areas obtained by dividing the first image 201. However, the size of the material images 203 need not necessarily be made to coincide with the size of the tile areas, and all of the material images 203 need not be of the same size. However, in a case where the size of the material images 203 and the size of the tile areas differ, it is necessary when pasting a material image 203 to a corresponding tile area that the size of this material image 203 be changed in conformity with the size of the tile area. Further, the shape of a tile area is not limited to the rectangular shape in FIG. 2; any shape is permissible. In a case where the shape of a tile area and the shape of material image 203 differ, it will suffice to cut or deform the shape of the material image 203 in conformity with the shape of the tile area to thereby bring the shapes of the material images into conformity with the shapes of the tile areas. It should be noted that the number P of material images is sufficiently larger than the M×N number of tile areas.

Figure 4:
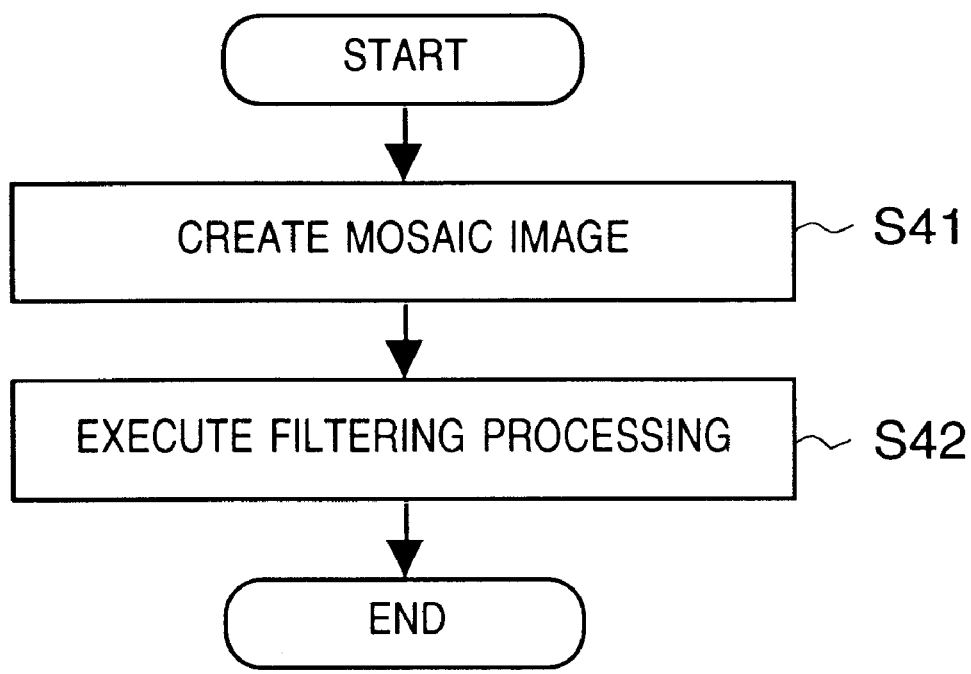
FIG. 4 is a flowchart useful in describing a method of generating a mosaic image according to a first embodiment of the present invention.

FIG. 4 is a flowchart illustrating the flow of general processing of a method of generating a mosaic image in the image processing apparatus of this embodiment.

At step S41 in FIG. 4, the first image 201 is analyzed, appropriate material images are selected from the plurality of material images and these are pasted to the tile areas, thereby creating the mosaic image 202. The details of this processing will be described later. Next, at step S42, a low-pass filter is applied to the mosaic image generated at step S41, whereby the boundaries of the tile areas are rendered inconspicuous. This filtering processing also will be described later in greater detail.

[Processing for Creating Mosaic Image (Step S41)]

Figure 5:
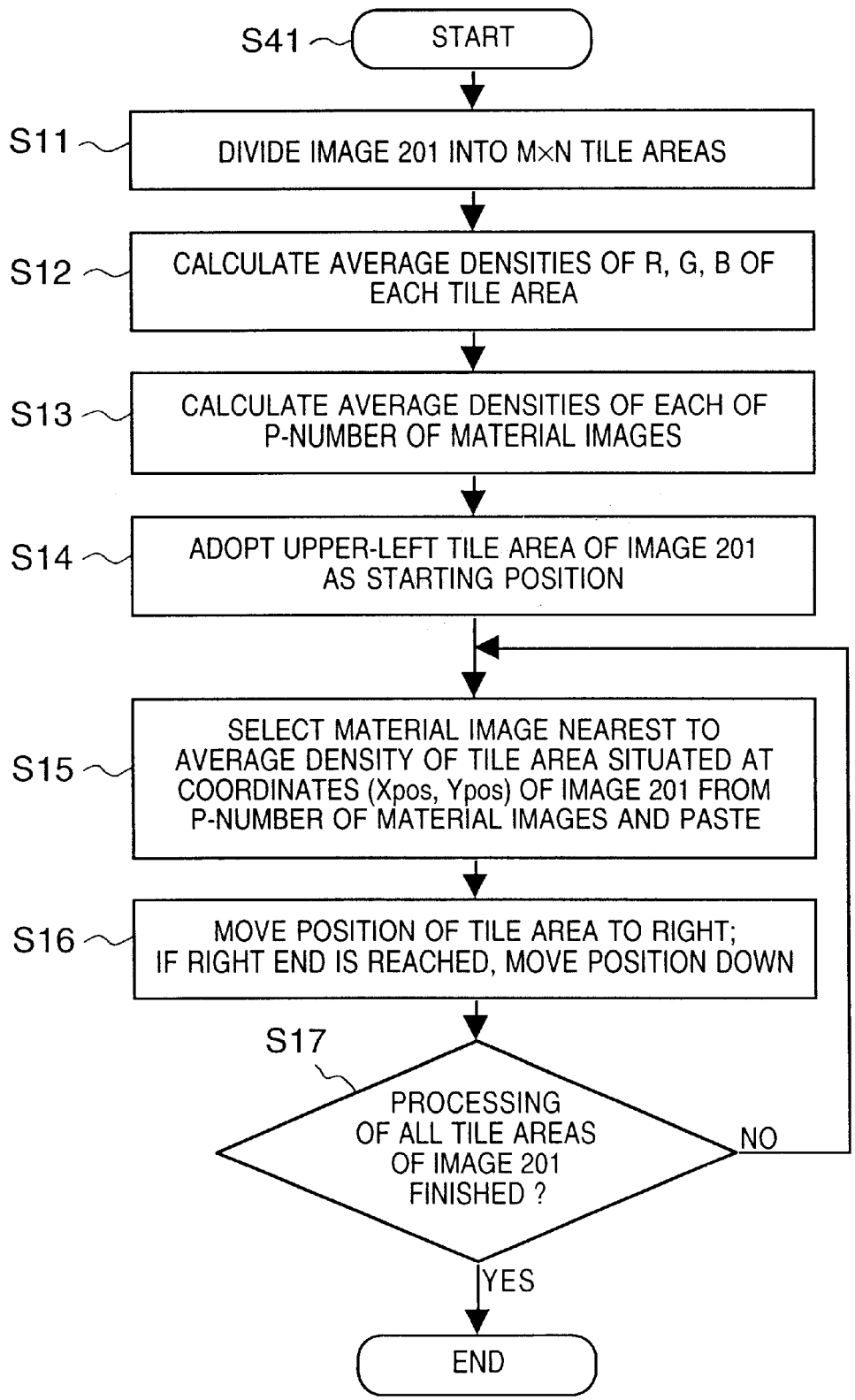
FIG. 5 is a flowchart illustrating an example of processing for generating a mosaic image in the image processing apparatus of this embodiment.

FIG. 5 is a flowchart illustrating the flow of processing of step S41 in FIG. 4 for synthesizing a mosaic image by selecting appropriate material images corresponding to the tile areas of an image to be processed.

The first image 201 is divided into the M×N number of tile areas, as shown in FIG. 2, at step S11. As a result, as shown in FIG. 6, the first image 201 is divided into M×N (e.g., M=4, N=5) rectangular tile areas TL (0,0), TL (1,0), TL (2,0), . . . , TL (2,4), TL (3,4).

Figure 6:
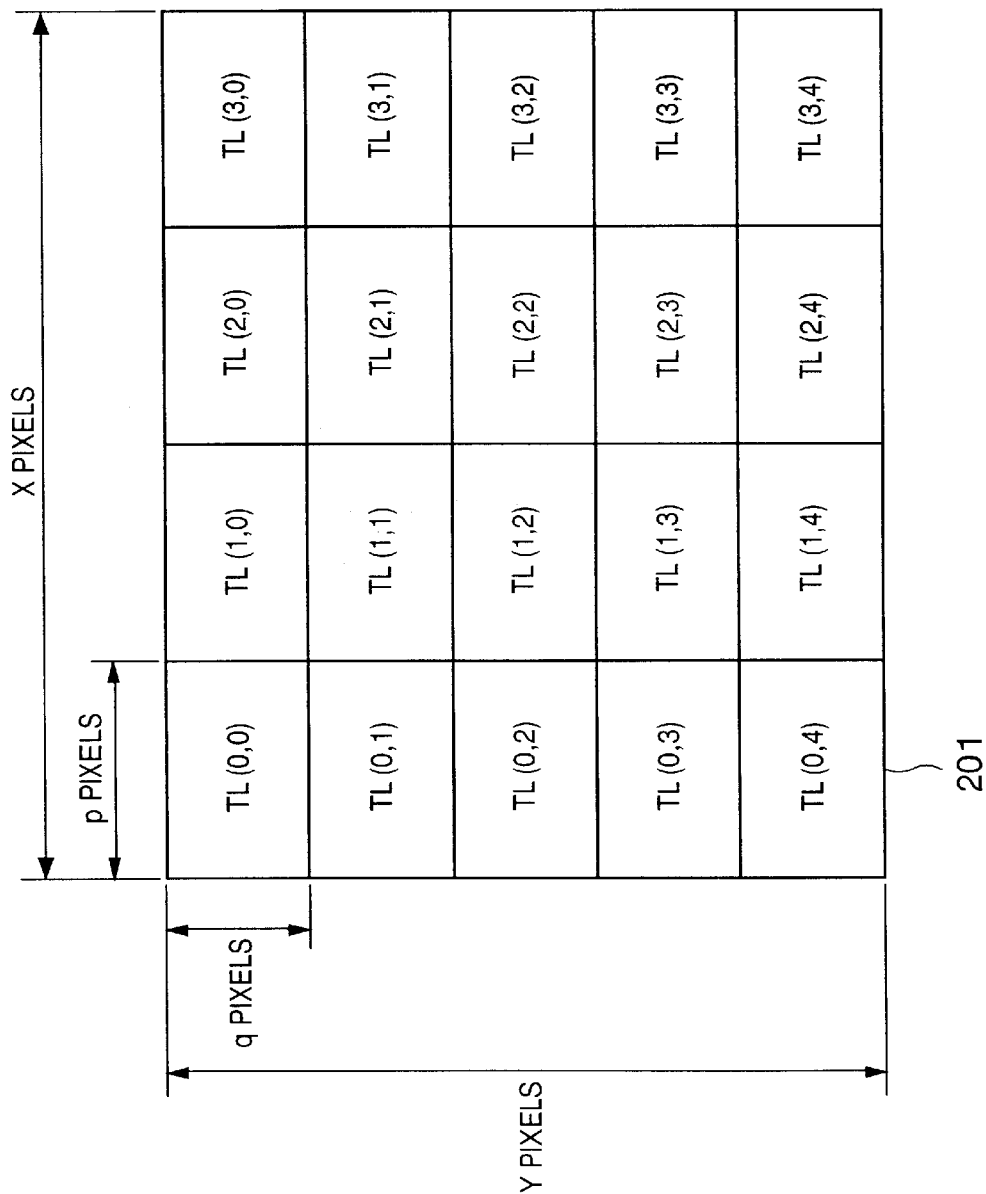
FIG. 6 is a diagram showing a state in which a first image (original image) has been divided into 4 ×5 tile areas.

In FIG. 6, X, Y represent the numbers of pixels in the horizontal and vertical directions, respectively, of the first image 201, and p, q represent the numbers of pixels in the horizontal and vertical directions, respectively, of each tile area. Accordingly, the relations X=p×M, Y=q×N hold. It should be noted that the sizes of all of the tile areas are assumed to be the same in order to simplify the description and that this is not necessarily required in this embodiment.

Figure 7:
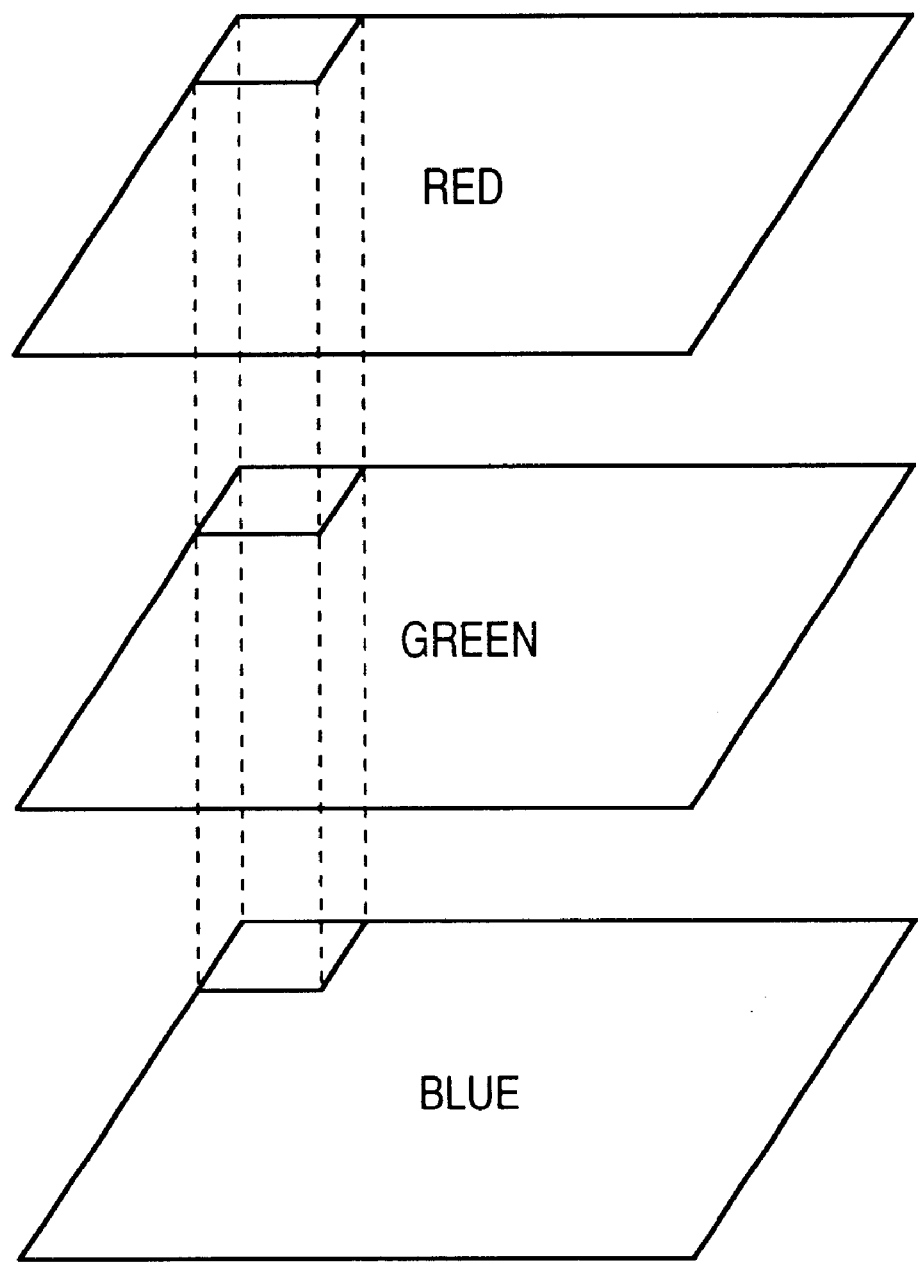
FIG. 7 is a diagram useful in describing color planes of the tile areas.

FIG. 7 is a diagram useful in describing the color make-up of each tile area. It will be appreciated from FIG. 7 that each tile area is broken down into the three primarily color planes of red (R), green (G) and blue (B) of p×q pixels each.

Next, control proceeds to step S12 in FIG. 5, at which the average densities of the color components R, G, B are calculated in accordance with the following equations in regard to each of the M×N tile areas obtained by division at step S11:

$$Rd\_av = \sum_{i=1}^{pq} Ri/(p \times q)$$

$$Gd\_av = \sum_{i=1}^{pq} Gi/(p \times q)$$

$$Bd\_av = \sum_{i=1}^{pq} Bi/(p \times q)$$

where "d_av" signifies the average density value of the destination (first image 201). For example, "Rd_av" represents the average density of the color red in a certain tile area of image 201. The same holds true in regard the other colors G and B.

This is followed by step S13, at which the average $$Rs\_av = \sum_{i=1}^{pq} Ri/(p \times q)$$

$$Gs\_av = \sum_{i=1}^{pq} Gi/(p \times q)$$

$$Bs\_av = \sum_{i=1}^{pq} Bi/(p \times q)$$

densities of R, G, B are calculated in accordance with the following equations in regard to each of the P-number of material images:

where "s_av" signifies the average density value of the source (material image 203). For example, "Rs_av" represents the average density of the color red in a certain material image 203. The same holds true in regard to the other colors G and B.

Control then proceeds to step S14, at which counters XPos (0≦XPos≦M−1), YPos (0≦YPos≦N−1), which indicate the position of a certain tile area to undergo processing, are both initialized to zero. Here (XPos, YPos)=(0,0) indicates the tile area [TL (0,0)] at the upper left-hand corner of image 201 in FIG. 6.

This is followed by step S15, at which the material image best suited for the tile area designated by the position counters XPos and YPos is selected from among the P-number of material images 203. By way of example, the selection method involves calculating an RGB tristimulus-value distance ΔE between the tile area undergoing processing and each material image, and selecting the material image having the smallest distance value as the material image best suited for this tile area. The estimating expression for ΔE is as follows:

$$\Delta E = (Rs\_av - Rd\_av)^2 + (Gs\_av - Gd\_av)^2 + (Bs\_av - Bd\_av)^2$$

On the basis of this expression, the material image for which the distance ΔE is smallest is selected as the optimum material image from among the P-number of material images 203.

Next, at step S16, the position of the tile area to be targeted in the first image 201 undergoing processing is moved to the next position. Here the tile area immediately to the right is adopted as the next target tile area as long as it is not at the right end of the row. If it is at the right end, then the tile area at the left end of the next row of underlying tile areas is adopted as the next target tile area. This is followed by step S17, at which it is determined whether processing of all tile areas of the first image 201 has been completed. The above-described processing is repeated until all tile areas have been processed.

As a result of this processing, the material image having the color density nearest to each tile area is selected and this material image is pasted to the tile area, thereby generating a mosaic image.

[Filtering Processing]

FIG. 8 is a diagram useful in describing an example of a filter used in filtering at step S42 according to the first embodiment of the present invention. This diagram illustrates an example of a filter having a characteristic which emphasizes the central portion of a 3×3 pixel matrix and reduces the values of the neighboring pixels, especially the pixel values located on the diagonals as seen from the center pixel.

Figure 9:
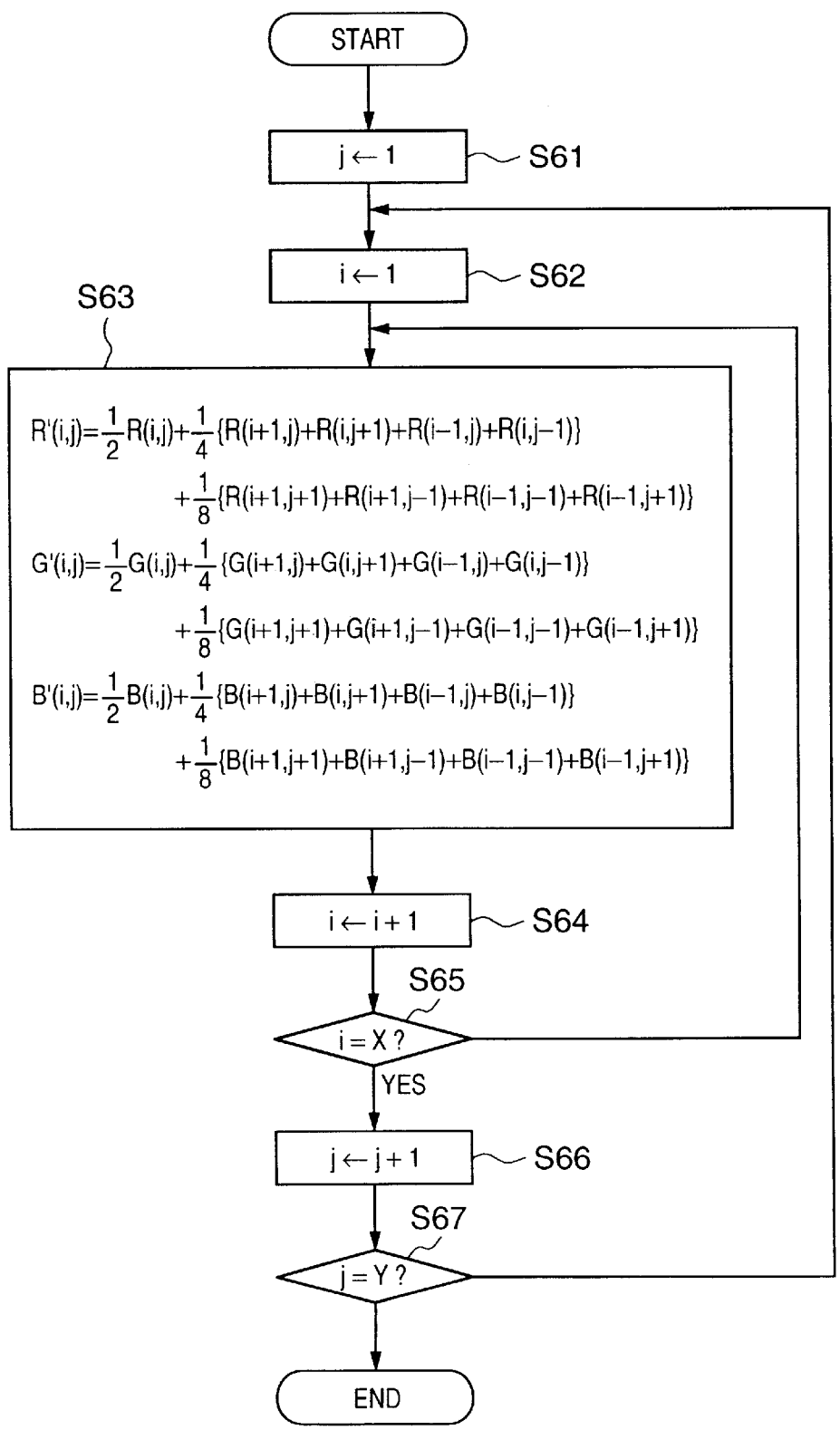
FIG. 9 is a flowchart useful in describing a low-pass filter according to the first embodiment of the present invention.

FIG. 9 is a flowchart illustrating filtering processing applied to each tile area using the filter of FIG. 8 according to the first embodiment. Here it is assumed that the mosaic image 202 has a width of X (pixels) and a height of Y (pixels), as shown in FIG. 6.

First, variables j, i are initialized to "1" at steps S61, S62 in FIG. 9. The variable j is a pointer for addressing a pixel position in the vertical direction of mosaic image 202 in FIG. 6, and the variable i is a pointer for addressing a pixel position in the horizontal direction of mosaic image 202. In FIG. 9, R(0,0), G(0,0), B(0,0) indicate the red, green and blue color components, respectively, of the pixel position at the upper left corner of mosaic image 202.

Next, at step S63, the low-pass filter shown in FIG. 8 is applied to each of the R, G, B color components in accordance with the following equations:

$$R'(i,j)=R(i,j)/2+[R(i+1,j)+R(i,j+1)+R(i-1,j)+R(i,j-1)]/4+[R(i+1,j+1)+R(i+1,j-1)+R(i-1,j-1)+R(i-1,j+1)]/8$$

$$G'(i,j)=G(i,j)/2+[G(i+1,j)+G(i,j+1)+G(i-1,j)+G(i,j-1)]/4+[G(i+1,j+1)+G(i+1,j-1)+G(i-1,j-1)+G(i-1,j+1)]/8$$

$$B'(i,j)=B(i,j)/2+[B(i+1,j)+B(i,j+1)+B(i-1,j)+B(i,j-1)]/4+[B(i+1,j+1)+B(i+1,j-1)+B(i-1,j-1)+B(i-1,j+1)]/8$$

As a result, there is obtained an image in which the density values of pixels neighboring the center pixel of a 3×3 pixel area have been reduced. (This is an image the edges whereof have been softened or rendered less distinct.)

Control then proceeds to step S64, at which the variable i is incremented by "1", and then to step S65, at which the value of variable i is compared with the pixel count X in the horizontal direction. If the two are not equal, control returns to step S63 and the above-described filtering processing is executed again. However, if it is found at step S65 that i=X holds, then control proceeds to step S66, where the variable j is incremented by "1". Next, at step S67, it is determined whether the value of variable j is equal to the pixel count Y in the vertical direction. In other words, the above-described processing is repeatedly executed until the processing of all pixels of the mosaic image 202 has been completed.

Thus, in accordance with the first embodiment as described above, the above-described filter is applied to all pixels of the mosaic image 202. As a result, the discontinuity at the joints of the material images that develops between neighboring tile areas can be made inconspicuous, thereby improving the image quality of the mosaic image.

Second Embodiment

In the first embodiment, a low-pass filter is applied to the entire mosaic image. An object of the present invention, however, is to eliminate the conspicuousness of discontinuity at the joints between neighboring tile areas. Accordingly, if a filter is applied solely to these joints, it should be possible to improve the quality of a mosaic image without detracting from the overall image quality of the mosaic image.

Figure 10:
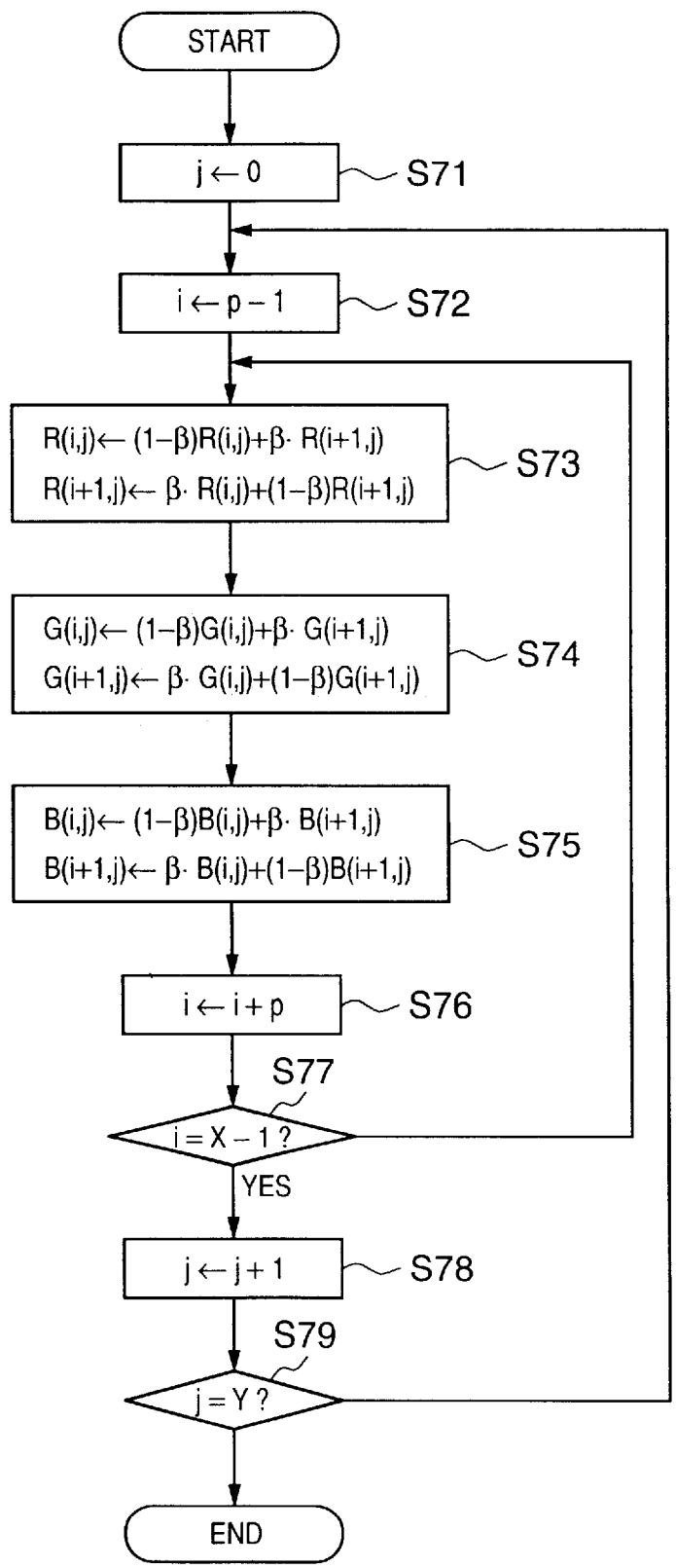
FIG. 10 is a flowchart useful in describing filtering processing at a boundary portion of a tile area according to a second embodiment of the present invention.

FIG. 10 is a flowchart showing filtering processing according a second embodiment that is based upon this principle.

First, the variable j is initialized to the value "0" at step S71 and then the variable i is initialized to the value p−1 at step S72. The variables i, j have the same meanings as those mentioned earlier. Further, the number of pixels in the horizontal direction of each tile area will be represented by p, just as in FIG. 6.

Control then proceeds to step S73, at which a low-pass filter is applied to the R color component of a pixel in the boundary portion on the right side of a tile area [initially the tile area TL(0,0) at the upper left corner], which is designated by the variables i, j of the mosaic image, in accordance with the following equations:

$$R(i,j) \leftarrow (1-\beta) \times R(i,j) + \beta \times R(i+1,j)$$

$$R(i,j+1) \leftarrow \beta \times R(i,j) + (1-\beta) \times R(i+1,j)$$

where β is a predetermined constant which satisfies the relation 0<β<0.5.

This is followed by step S74, at which the low-pass filter is applied similarly to the G color component in accordance with the following equations:

$$G(i,j) \leftarrow (1-\beta) \times G(i,j) + \beta \times G(i+1,j)$$

$$G(i,j+1) \leftarrow \beta \times G(i,j) + (1-\beta) \times G(i+1,j)$$

This is followed by step S75, at which the low-pass filter is applied similarly to the B color component in accordance with the following equations:

$$B(i,j) \leftarrow (1-\beta) \times B(i,j) + \beta B(i+1,j)$$

$$B(i,j+1) \leftarrow \beta \times B(i,j) + (1-\beta) \times B(i+1,j)$$

Next, control proceeds to step S76, at which p is added to the variable i. As a result, the pixel to undergo filtering next is a pixel on the right edge of the tile area on the right side {i.e., the tile area [TL(1,0) neighboring the tile area [TL(0, 0)] on the right]. Next, at step S77, the value of variable i and the value of (X−1) are compared. If the two are not equal, control returns to step S73 and the above-described processing is executed. If the two are equal, on the other hand, control proceeds to step S78 by reason of the fact that processing up to the tile area [TL(3,0)] on the right end of the first line has been completed. The variable j is incremented by "1" at step S78. Next, at step S79, the value of variable j and the value of Y are compared. If the two are not equal, control returns to step S72 and the above-described processing is executed with the value of variable i being made p−1. The above-described processing is thus executed repeatedly until the relation j=Y is established (at which point the lowermost list of the mosaic image would be exceeded). As a result of this processing, the pixels in the boundary portions of neighboring tile areas of the mosaic image are averaged, thereby making it possible to reduce variations in density at the boundary portions and, as a result, to make the boundary portions inconspicuous.

Thus, by virtue of the processing according to the second embodiment described above, the densities of pixels at the joints of tile portions in the horizontal direction are averaged so that the density between neighboring tile areas can be smoothened.

Though not described above, similar processing applied to the vertically directed joints between tiles also makes it possible to obtain a high-quality mosaic image in which discontinuity at the horizontally directed joints between tile areas is rendered inconspicuous.

Furthermore, according to the second embodiment, a filter having a width of two pixels is applied at the joints between tile areas. However, this does not impose a limitation upon the present invention because a filter having a large width may be applied depending upon the resolution of the image.

Third Embodiment

A third embodiment of the present invention will now be described. The third embodiment deals with an example in which a mosaic image is produced by removing a border portion contained in a material image.

Figure 11:
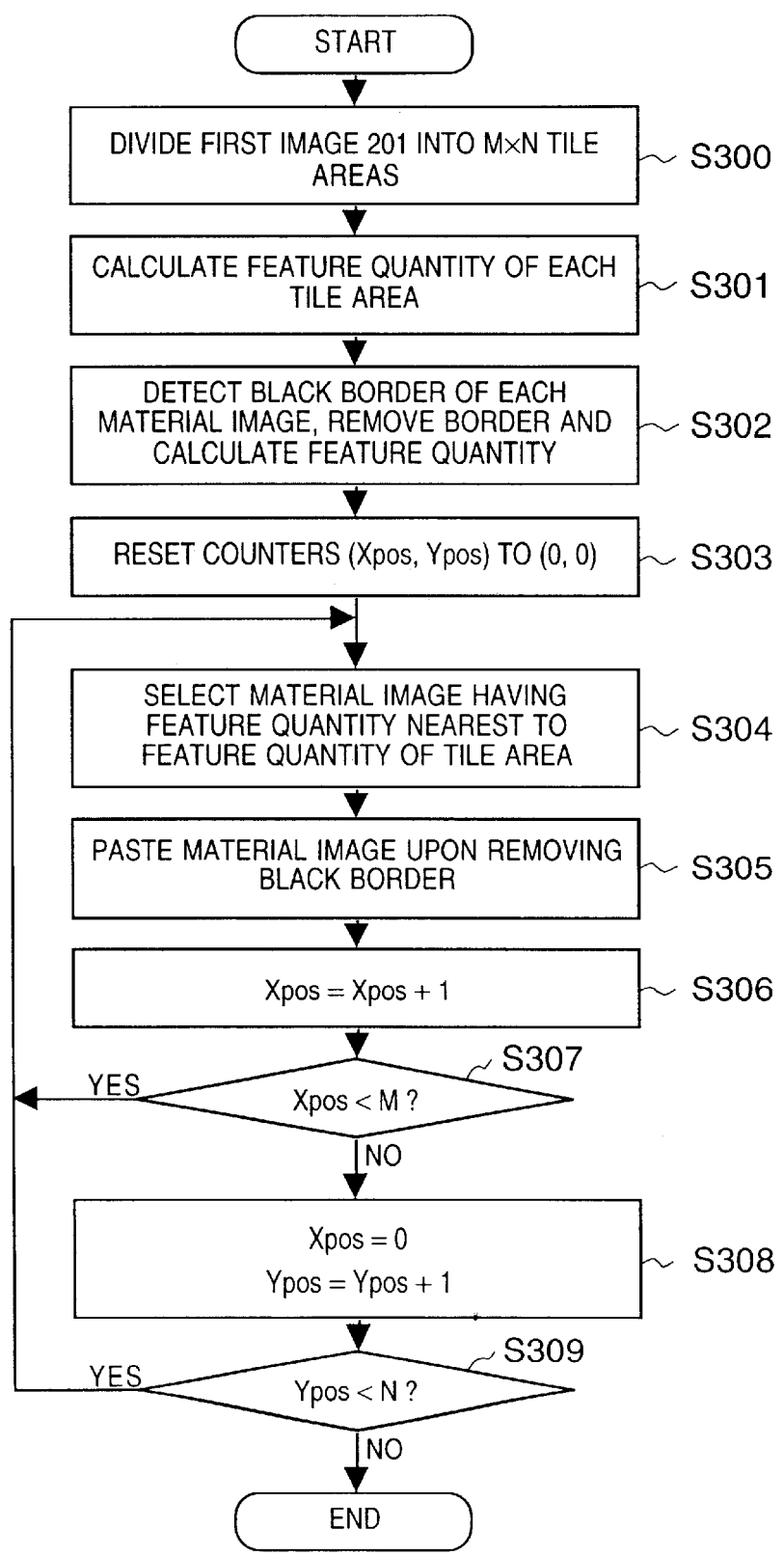
FIG. 11 is a flowchart illustrating an operation for generating a mosaic image according to a third embodiment of the present invention.

FIG. 11 is a flowchart illustrating a method of generating a mosaic image according to a third embodiment of the present invention.

The first image 201 read in by the reader 109 and stored in the RAM 105 is divided into M×N tile areas at step S300. Here, in a manner similar to that of the first embodiment, the first image 201 is split into the M×N areas (tile areas), as shown in FIG. 2. As a result, as shown in FIG. 6, the first image 201 is divided into M×N (e.g., M=4, N=5) rectangular tile areas TL(0,0), TL(1,0), TL(2,0), ..., TL(2,4), TL(3,4), by way of example.

Control then proceeds to step S301, at which the R, G, B average densities are calculated, in a manner similar to that performed at step S12 in FIG. 5, in regard to each of the M×N tile areas obtained by division at step S300. The values thus calculated are stored in RAM 105.

Next, at step S302, an image area indicative of a border is detected in regard to each of the P-number of material images 203 and the average density is calculated upon removing the image area indicative of the border. It should be noted that this embodiment is being described for a case where a black border serves as an example of this image area indicative of a border. Reference will now be had to the flowchart of FIG. 12 to describe an operation through which average density is calculated upon detecting, and then removing, a black border of a material image that has been read in.

First, at step S600, the material image is read in from the storage unit 106, then, at step S601, whether the material image read in has a black border is detected and information relating to any detected black border is stored in RAM 105. Control then proceeds to step S602, at which the information that has been stored in RAM 105 is read out and a judgment is made as to whether a black border was detected. Control proceeds to step S604 if a black border was not detected and to step S603 if a black border was detected.

A detected black border is removed and then the average densities of the color components R, G, B are calculated at step S603 in accordance with the equations below. The values thus calculated are then stored in RAM 105.

$$R's\_av = \sum_{i=1}^{p'q'} Ri/(p' \times q')$$

$$G's\_av = \sum_{i=1}^{p'q'} Gi/(p' \times q')$$

$$B's\_av = \sum_{i=1}^{p'q'} Bi/(p' \times q')$$

where "s_av" signifies the average density value of the source (material image 203) and p', q' indicate the pixel counts in the horizontal and vertical directions of the material image from which the black border has been removed. Accordingly, "R's_av", for example, represents red average density of a certain material image 203 from which the black border has been removed. The same holds for the other color components.

If it is decided at step S602 that no black border is present, then, at step S604, the average densities of R, G, B of each material image are calculated in a manner similar to that at step S13 in FIG. 5. The values thus calculated are stored in RAM 105.

When the feature quantity (the average density of each color component) of each tile area and the feature quantity (the average density of each color component) of each material image are thus found, control proceeds to step S303 in FIG. 11, at which counters XPos ($0 \leq X\cdot Pos \leq M-1$), YPos ($0 \leq YPos \leq N-1$), which indicate the position of a certain tile area in image 20 201 to undergo processing, are both initialized to zero. Here (XPos, YPos)=(0,0) indicates the tile area [TL(0,0)] at the upper left-hand corner of image 201 in FIG. 6.

This is followed by step S304, at which the material image best suited for the tile area designated by the position counters XPos and YPos is selected from among the P-number of material images 203. By way of example, and in the manner described earlier, the selection method involves calculating an RGB tristimulus-value distance ΔE between the tile area undergoing processing and each material image, and selecting the material image having the smallest distance value as the material image best suited for this tile area. The estimating expression for ΔE is as follows:

$$\Delta E = (R's\_av - Rd\_av)^2 + (G's\_av - Gd\_av)^2 + (B's\_av - Bd\_av)^2$$

On the basis of this expression, the material image for which the distance ΔE is smallest is selected as the optimum material image from among the P-number of material images 203.

Control then proceeds to step S305. Here the selected material image from which the black border was removed using the black-border detection results obtained at step S302 is pasted to the tile area, as indicated in the flowchart of FIG. 13, described later. It should be noted that if the size of this tile area and the size of material image from which the black border has been removed do not agree when the selected image is pasted to the tile area, scaling processing is executed so as to make the size of the material image conform to the size of the tile area.

Control then proceeds to step S306, at which the position counter XPos is incremented by 1 so that the position of the tile area to be targeted in the first image 201 undergoing processing is moved to the next position. This is followed by step S307, at which it is determined whether the tile area at the right end has been exceeded (i.e., whether XPos=M holds). If the tile area at the right end has not been exceeded, the tile area neighboring to the right is adopted as the next targeted tile area and the above-described processing from step S304 onward is repeated. If the tile area at the right end has been exceeded, however, then control proceeds to step S308, at which the position counter YPos is incremented by 1 so that as to advance processing to the underlying row of tile areas. Here the tile area at the leftmost end of this row is adopted as the targeted tile area. Until the value of the position counter YPos becomes equal to N at step S309, control returns to step S304 and the above-described processing is repeated. If it is determined at step S309 that processing has been applied to all N×M tile areas, then this processing is exited.

As a result of this processing, a feature quantity of each material image from which the border has been removed is obtained, the material image having a feature quantity (color density) closest to the feature quantity of each tile area is selected, the border of this material image is removed and the material image is pasted to the tile area, thereby generating a high-quality mosaic image exhibiting excellent color.

Figure 12:
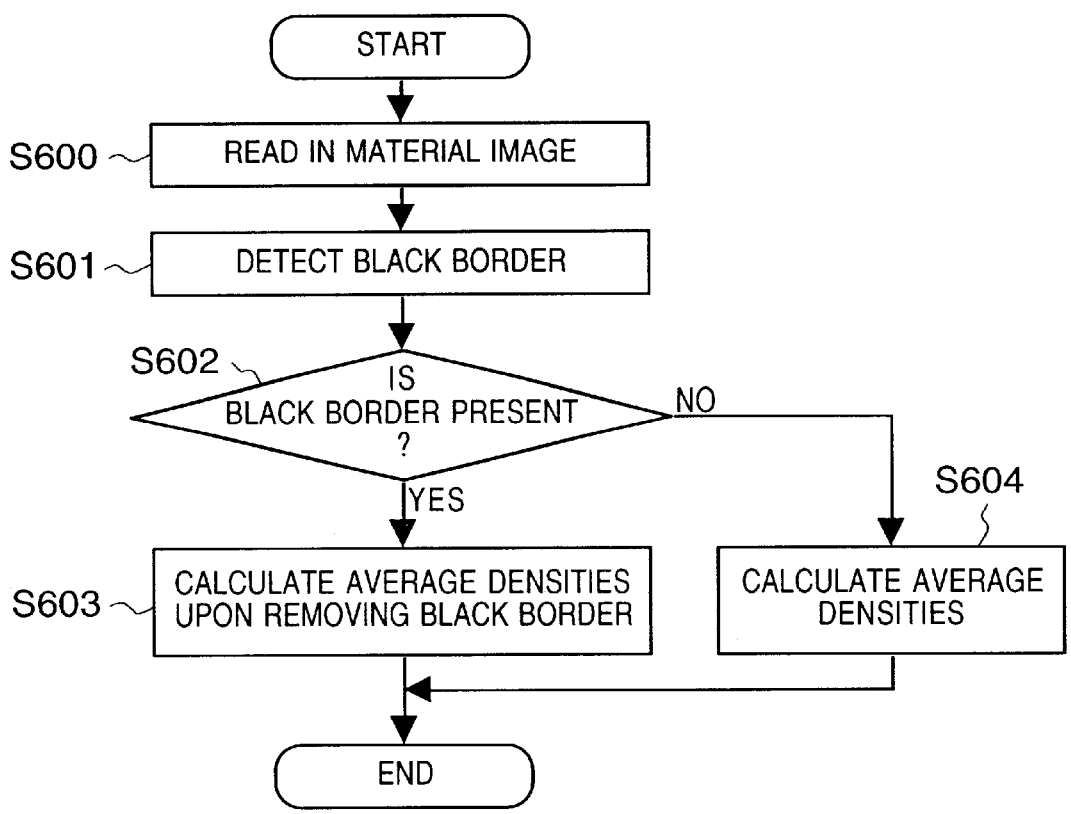
FIG. 12 is a flowchart illustrating an operation for calculating average density upon removing a black border of a material image in accordance with the third embodiment.

Next, the processing for detecting the black border of a material image at step S602 in FIG. 12 will be described with reference to the flowchart of FIG. 13.

The material image is input and stored in RAM 105 at step S700 in FIG. 13. It should be noted that this material image may be stored in the storage unit 106 beforehand. Control then proceeds to step S701, at which the RGB-component data of this material image is created and stored in RAM 105. Next, at step S702, the total of the R, G, B components is subjected to threshold-value processing to thereby create a bitmap indicating the black border of this material image. The bitmap indicating the black border is then subjected to filter processing, etc., to thereby eliminate noise from the bitmap. The data indicating the black-border bitmap from which noise has been eliminated is stored in RAM 105 again. Control then proceeds to step S703, at which a projective distribution is created, along the Y axis, from the bitmap indicative of the black border. The projective distribution thus generated is smoothened, subjected to defocusing processing and converted to multilevel logic. The position and width of the black border along the X axis are obtained by this Y-axis projection.

Next, at step S704, the projective distribution corresponding to the position and width detected along the X axis is calculated from the bitmap indicative of the black border stored in RAM 105 at step S702. This is followed by step S705, at which the Y-axis position and limits of the black border constituting the black border of the material image are calculated by threshold-value processing from the partial projective distribution along the X axis obtained at step S704. The final position of the black border is extracted taking the projective distribution in the Y direction within the Y- and X-axis limits thus obtained.

FIG. 14 is a diagram showing an example of a material-image black border detected by the X- and Y-axis projection processing of FIG. 13.

Reference numeral 1400 in FIG. 14 denotes a projective distribution of a black-border area in a case where the projection is along the X axis, and reference numeral 1401 denotes a projective distribution of the black-border area in a case where the projection is along the Y axis. Accordingly, width T, width B, width L and width R of the border on the top, bottom, left and right sides, respectively, of the black-border area are obtained.

As a result, image data corresponding to the border area of this material image is removed, the average densities of the R, G, B components of a material image having a width W and a height H are calculated, the corresponding tile area is decided based upon these average densities and the material image from which the border has been removed is pasted to this tile area.

In a case where the size of the material image of width W and height H is smaller than the size of the corresponding tile area at this time, the material image of width W and height H is subjected to scaling before it is pasted to the tile area.

Thus, in accordance with the third embodiment as described above, the border area of a material image is detected and the average density of the material image from which the border has been removed is calculated, whereby the optimum tile area can be selected without the influence of the border.

Further, by detecting the border of a material image, removing the border and then pasting the material image to a tile, it is possible to prevent the occurrence of a grid pattern in a mosaic image caused by the borders of the material images. As a result, a mosaic image of improved image quality can be generated.

Though the third embodiment has been described taking a black border of a material image as an example, this does not impose a limitation upon the present invention. For example, the present invention covers a case in which, when a material image is selected and, further, a mosaic image is generated, an image area considered to be influential is removed from the material image and the material image devoid of this image area is pasted.

Further, in the third embodiment, a material image having a feature quantity nearest to that of a tile area is selected at step S304 in FIG. 11, and an image area indicative of a black border of the material image is removed and the resulting image area is pasted to a tile area at step S305 to generate a mosaic image. However, an arrangement may be adopted in which an image area nearest to a feature quantity of a tile area of interest is set and selected within an image area from which the border of the material image has been removed, the selected image area is extracted and the extracted image area is pasted to the tile area of interest to thereby generate the mosaic. In this case the size of the image area set is considered to be smaller than the size of the tile area of interest. In such case there is a strong possibility that scaling processing will become essential to achieve conformity with the size of the tile area.

According to the foregoing embodiment, a case is described in which material images are compared with a tile area of interest, the material image whose color is closest to the tile area of interest is selected and this material image is pasted to the tile area to generate a mosaic image. However, the invention may be applied also to a search system which searches for similar material images, by way of example. This similar-image search system retrieves an image, which resembles an input image entered by a user, from material images that have been stored in a database and displays the decided similar image on the monitor of a computer to provide the image to the user.

Further, when a material image is selected in the foregoing embodiment, the densities of the respective color components are calculated as the feature quantities of the material images and tile areas and a material image having the most suitable color-component densities is selected. However, this does not impose a limitation upon the present invention, for an arrangement may be adopted in which the pixels of the material images are compared with the corresponding pixels of the tile areas and the best material image is selected based upon the comparison.

In the third embodiment, a black border of material image is detected by X- and Y-axis projection processing. However, the black border may be detected by other methods. For example, a cutting frame may be set in advance and the periphery of a material image may be removed based upon the set cutting frame, thereby removing the black border.

Further, an arrangement may be adopted in which the material image is displayed on the display unit 103 and the user designates the black border using a mouse or the like while observing the displayed image, thereby removing this portion of the image.

Further, an arrangement may be adopted in which a black border is detected and removed when a material image is read in from the reader 103. This will make it possible to create a database which stores material images, namely a database of material images without black borders, thereby enabling a reduction in the amount of data.

Further, an arrangement may be adopted in which black borders are removed from material images automatically at a time set by the user. For example, it is possible to remove black borders when the power supply of the apparatus is on but the apparatus is not being operated (i.e., when the user is not present).

In addition, the characteristic quantity of each material image may be, in advance, calculated and stored in related to the corresponding material image in this case, the procedures of S13 in FIG. 5 and S302 in FIG. 11 can be omitted.

The foregoing embodiments have been described independently of one another. It is obvious that these embodiments may be implemented independently or in combination.

The present invention can be applied to a system constituted by a plurality of devices (e.g., a host computer, interface, reader, printer, etc.) or to an apparatus comprising a single device (e.g., a copier or facsimile machine, etc.).

Furthermore, it goes without saying that the object of the invention is attained also by supplying a storage medium storing the program codes of the software for performing the functions of the foregoing embodiments to a system or an apparatus, reading the program codes with a computer (e.g., a CPU or MPU) of the system or apparatus from the storage medium, and then executing the program codes. In this case, the program codes read from the storage medium implement the novel functions of the embodiments, and the storage medium storing the program codes constitutes the invention. Furthermore, besides the case where the aforesaid functions according to the embodiments are implemented by executing the program codes read by a computer, it goes without saying that the present invention covers a case where an operating system or the like running on the computer performs a part of or the entire process in accordance with the designation of program codes and implements the functions according to the embodiments.

It goes without saying that the present invention further covers a case where, after the program codes read from the storage medium are written in a function expansion board inserted into the computer or in a memory provided in a function expansion unit connected to the computer, a CPU or the like contained in the function expansion board or function expansion unit performs a part of or the entire process in accordance with the designation of program codes and implements the function of the above embodiment.

In accordance with the embodiments of the present invention as described above, the quality of a mosaic image can be improved by making the joints of the tile areas of the mosaic image less noticeable.

Further, a high-quality mosaic image can be generated by removing unnecessary portions contained in material images, deciding tile areas to which these material images are to be pasted based upon the feature quantities of these material images from which the unnecessary portions have been removed, and then pasting these material images to the tile areas that have been decided.

The present invention is not limited to the above embodiments and various changes and modifications can be made within the spirit and scope of the present invention. Therefore, to apprise the public of the scope of the present invention, the following claims are made.

What is claimed is:

1. An image processing method for forming a mosaic image by combining a plurality of material images, comprising the steps of:

dividing an image, which is the basis of the mosaic image, into a plurality of areas;

calculating an average value of each of R, G, and B color components in each of the plurality of areas into which the image has been divided in said dividing step;

forming a mosaic image by calculating differences between the average value of each of R, G, and B color components in each of the plurality of areas and an average value of R, G, and B color components in each of the material images, and selecting and pasting a material image having a minimum difference to respective ones of the areas so as to form the mosaic image; and applying a pixel matrix having a size corresponding to the resolution of the mosaic image to joints between the material images and performing a filtering process on the mosaic image, wherein the filtering process is independently performed on each of R, G, and B color components of the joints of the material images.

2. The method according to claim 1, wherein the filtering process includes applying a low-pass filter to each pixel of the mosaic image.

3. The method according to claim 2, wherein the low-pass filter is an edge softening filter.

4. The method according to claim 1, wherein the filtering process includes applying a low-pass filter to each pixel of a boundary portion of each area of the mosaic image.

5. The method according to claim 4, wherein the low-pass filter is a filter for averaging the density of pixels bracketing the boundary portion.

6. An image processing method according to claim 1, further comprising the step of removing a border from each of the material images, wherein the average value of each of R, G, B color components is calculated for each of the material images in which the border has been removed.

7. An image processing apparatus for forming a mosaic image by combining a plurality of material images, comprising:

dividing means for dividing an image, which is the basis of the mosaic image, into a plurality of areas;

calculation means for calculating an average value of each of R, G, and B color components in each of the plurality of areas into which the image has been divided by said dividing means;

mosaic image forming means for calculating differences between the average value of each of R, G, and B color components in each of the plurality of areas and an average value of R, G, and B color components in each of the material images, and selecting a material image having a minimum difference to respective ones of the areas, and pasting the selected material image so as to form a mosaic image; and filtering means for applying a pixel matrix having a size corresponding to the resolution of the mosaic image to connecting portions of the material images and performing a filtering process on the mosaic image formed by said mosaic image forming means, wherein the filtering process is independently performed on each of R, G, and B color components of the connecting portions of the material images.

8. The apparatus according to claim 7, wherein said filtering means applies a low-pass filter to each pixel of the mosaic image.

9. The apparatus according to claim 8, wherein the low-pass filter is an edge softening filter.

10. The apparatus according to claim 7, wherein said filtering means applies a low-pass filter to each pixel of a boundary portion of each area of the mosaic image.

11. The apparatus according to claim 10, wherein the low-pass filter is a filter for averaging the density of pixels bracketing the boundary portion.

12. An image processing apparatus according to claim 7, further comprising removal means for removing a border from each of the material images, wherein the average value of each of R, G, and B color components is calculated for each of the material images in which the border has been removed.

13. A computer-readable storage medium storing a program which implements an image processing method for forming a mosaic by combining a plurality of material images, said program comprising:

code for dividing an image, which is the basis of the mosaic image, into a plurality of areas;

code for calculating an average value of each of R, G, and B color components in each of the divided plurality of areas into which the image has been divided in said dividing step;

code for calculating differences between the average value of each of R, G, and B color components in each of the plurality of areas and an average value of R, G, and B color components in each of the material images, and selecting and pasting a material image having a minimum difference to respective ones of the areas so as to form the mosaic image; and code for applying a pixel matrix having size corresponding to the resolution of the mosaic image to connecting portions of the material images and performing a filtering process on the mosaic image, wherein the filtering process is independently performed on each of R, G, and B color components of the connecting portions of the material images.

* * * * *